June 6, 1933.   M. T. SANDERS   1,913,340
ACTIVATING CARBON
Filed Feb. 3, 1931   2 Sheets-Sheet 1

Inventor
Marshall T. Sanders,
By K. P. McElroy
Attorney

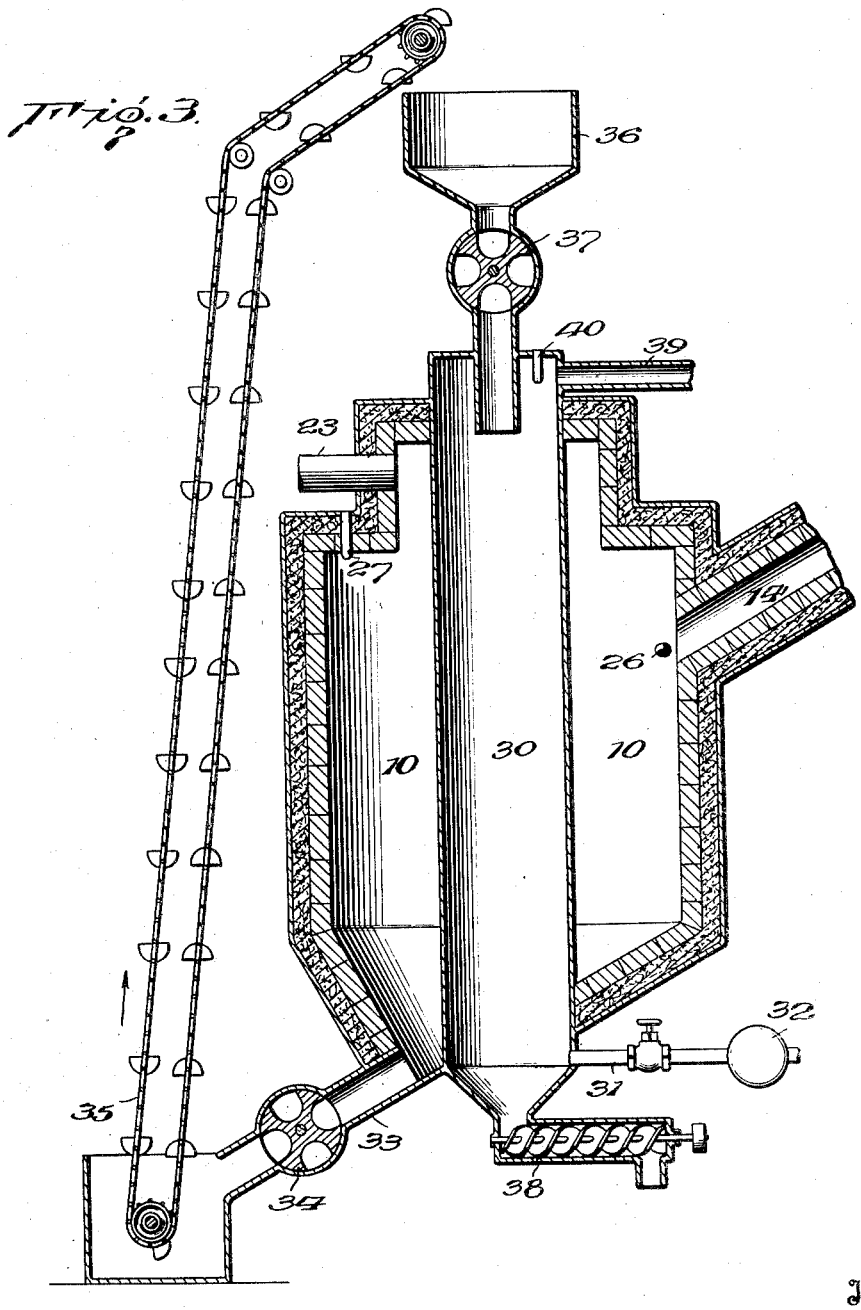

Patented June 6, 1933

1,913,340

UNITED STATES PATENT OFFICE

MARSHALL T. SANDERS, OF WILMINGTON, DELAWARE, ASSIGNOR TO DARCO CORPORATION, OF WILMINGTON, DELAWARE, A CORPORATION OF DELAWARE

ACTIVATING CARBON

Application filed February 3, 1931. Serial No. 513,217.

This invention relates to activating carbon and it comprises a process of activating raw carbon or reactivating spent carbon wherein the material to be activated is pulverized, suspended and dispersed in a definitely limited amount of air and is then ignited in a reaction chamber maintained by the heat of the oxidation at temperatures above 800° C., the temperature being controlled and activation being assisted by introducing steam into the reaction chamber and the activated carbon being separated from the gaseous reaction products within the chamber; all as more fully hereinafter set forth and as claimed.

Activation of carbonaceous materials to increase their power of adsorption is accomplished by heat treatment in various ways, one of the commonest being the subjecting of raw material or of "spent" material during the heat treatment to an atmosphere of $CO_2$ or steam or products of combustion containing both. As a rule the temperatures maintained during such treatment have ranged well above 800° C., and in some cases have been above 1300° C. It has also been proposed to use air as an activating agent during the heat treatment with a view to applying the oxidizing action of the air oxygen to prevent charring of the material and consequent clogging of its pores. When air has been thus used it has usually been found necessary to keep the temperature below 500° C. to prevent overburning and it has been found impossible under these conditions to obtain a satisfactory degree of uniformity in the operation and product. The action of air at low temperatures is slow and hence the capacity of the apparatus is limited. Temperature control is difficult.

Various apparatus arrangements have been used in activating carbon. Sometimes the material is treated in horizontal rotating cylinders, sometimes in stationary vertical chambers. The reaction chambers have been in some cases externally heated and in others they have been adapted to internal heating by superheated activating gases. Combinations of both internal and external heating have been proposed.

In Patent No. 1,873,998 to Davis, whereon the present invention in some of its aspects is an improvement, a method and means of carbon activation, particularly adapted to revivification of spent carbons, is described and claimed wherein activation is effected by the action of air at temperatures ranging around and above 800° C. in an externally heated tube, the amount of air being definitely proportioned to the amount of volatile matter in the material undergoing activation and a selective oxidation of volatile matter or adsorbed matter being effected during passage of a carbon-air dispersion through the tube.

I have found that by means of a special arrangement of apparatus the activation of suitable raw material or the revivification of spent activated carbon can be accomplished, using air oxygen as the activating agent and obtaining all of the heat needed to maintain the activating temperature from the exothermic reaction of the oxygen upon the material being activated. So doing, I find it advantageous to control the temperature by conserving the heat of reaction through adequate insulation of the reaction chamber and by introducing a controlled quantity of steam into the reaction chamber. It is also advantageous to adapt the reaction chamber to effect therein a separation of the carbon material from the gaseous products produced by the air and to introduce steam into the reaction chamber at such a location that steam reacts with the carbon material after its separation from the air reaction gases. The steam acts both to complete the carbon activation and to moderate the temperature by endothermic action as well as by taking up sensible heat.

In an apparatus embodiment of my invention, involving operation of the described method, the carbonaceous material to be activated is after fine grinding suspended and dispersed in a current of air passing through a chamber inclined at a slight angle to the horizontal which delivers into a vertical chamber of substantially larger area than the inclined chamber and the steam is introduced into the vertical chamber advantageously at a point well below the point of entry of the carbon-air dispersion; the vertical chamber being provided with gas outlet at the top and with carbon outlet means at the bottom; the cross-sectional area of the vertical chamber being such that the activated carbon settles out of the gases to the bottom of the chamber.

In a modified form of my apparatus the vertical reaction chamber is divided into an external and an internal portion, the air reaction taking place in the external chamber and thereby heating the internal chamber and the carbon, after separation from the air gases, being transferred from the bottom of the external chamber to the top of the internal chamber to be dropped through an upward current of steam introduced near the bottom of the internal chamber.

In the process embodiment of my invention the oxidation by air oxygen of the material being activated is relied upon to maintain the temperature proper for speedy activation, which I have found to be from 800 to 1050° C. a part of the heat of the exothermic oxidation being utilized in supplying the heat absorbed in the endothermic oxidation of the carbon material with steam. In some cases it is desirable to preheat the steam and for this the gases formed in the activation reactions may be used as fuel. The air also may be preheated.

Regulation of the operation of the present invention, using air alone as the activating agent, may be merely by dissipating the heat formed in the activating reaction as by externally cooling the reaction chamber. But in most cases I find it better to conserve the heat of reaction by carrying it on in a heat insulated chamber and introducing steam into the chamber in an amount so proportioned to that of the air that the temperature is moderated and controlled within the desired range. In all cases the quantity of air in which the starting material is dispersed is carefully regulated in proportion to the volatile matter in the material. The quantity of air varies with different materials and usually ranges between 70 and 130 cubic feet (measured at 60° F. and atmospheric pressure) per pound of volatile combustible matter in the raw material. In a properly insulated reaction chamber, the necessary activating temperature can in most cases be maintained with a proportion of air to carbonaceous material such that CO is formed with but little $CO_2$, the heat being largely provided by selective oxidation of contained volatile combustible matter to CO and $H_2O$, but little of the solid carbon of the raw material being consumed. With greater air ratios more $CO_2$ may be formed and some of the solid carbon may be gasified. When using a raw material such for example as lignite, the conditions of temperature, time or rate of reaction and air ratio can be so adjusted that high yields of finished activated carbon are obtained and the gases produced in activation have a good fuel value.

It is of course possible to use oxygen-enriched air in the present process and when oxygen for enrichment is cheaply available, this may have advantage in increasing apparatus capacities.

In the accompanying drawings I have shown more or less diagrammatically apparatus within my invention. In this showing, Fig. 1 is a view in vertical section of an activating apparatus;

Fig. 3 is a vertical section partly in elevation of a modified activating apparatus.

Figure 1:
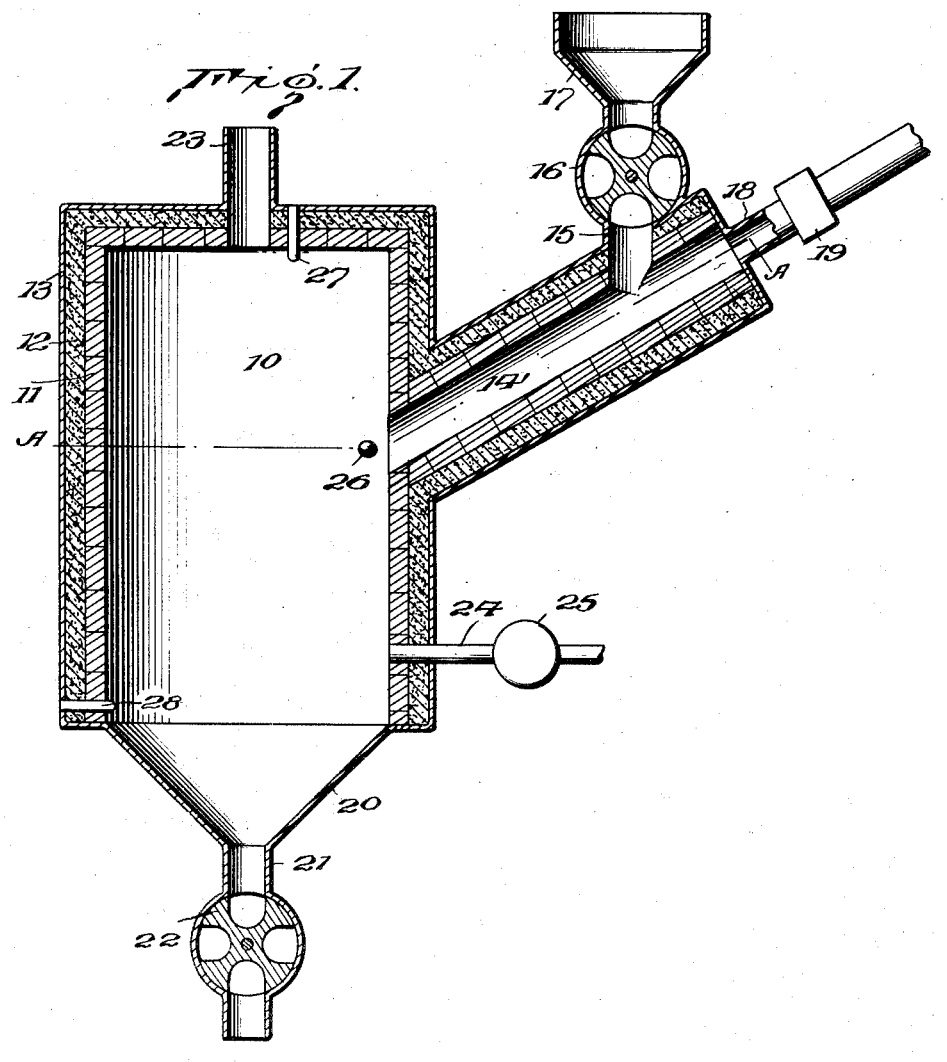
Figure 2:
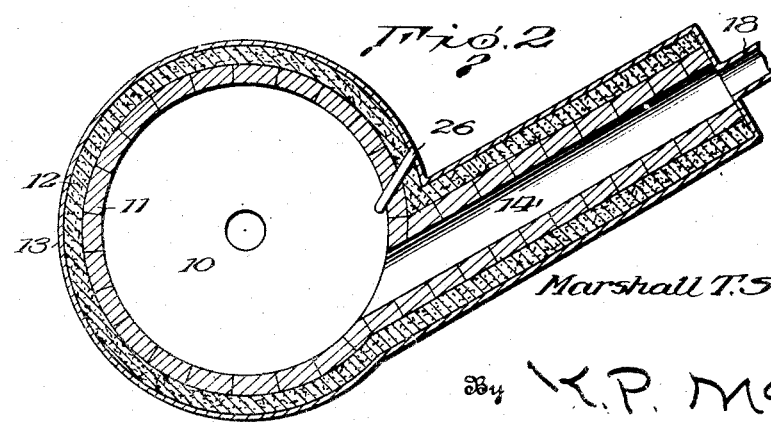
Fig. 2 is a horizontal section along the line A—A of Fig. 1.

Referring first to Figs. 1 and 2, the vertical activating chamber 10 is provided with a refractory lining 11 backed by heat insulating material 12 and has an external metal shell 13. The activating chamber has a tangential, inclined, horizontally disposed projection 14 which is adapted to receive through a funnel 15 the finely powdered material to be activated. Funnel 15 is provided with a star valve 16 and receives the ground material from hopper 17. A worm and tube may be used instead of the funnel and valve for introducing carbon material into 14. Into the outer end of horizontal chamber 14 a current of air is blown (by suitable means not shown) through air conduit 18 provided with a meter 19. As shown, the inclined projection 14 joins with vertical chamber 10 near its middle portion and the vertical chamber has a cross-sectional area much larger than that of the projection, being thereby adapted to cause separation from the gases in the chamber of suspended material carried by the air current through the horizontal chamber portion. Vertical chamber 10 has a conical bottom 20 which is shown as un-insulated, and from the bottom leads a conduit 21 provided with a valve or worm 22, the arrangement being adapted to continuous removal of activated material from the activating chamber. Gases leave the vertical chamber 10 through the stack 23 and the gases may be withdrawn by a suitable suction device (not shown). Into the vertical chamber 10 at a level well below that of the horizontal chamber 14 steam can be admitted through a steam line 24 provided with a meter 25. The steam is advantageously admitted to chamber 24 in a tangential stream. The activating chamber is adapted to insertion of pyrometers at 26, 27 and 28 for purposes of temperature observation and control.

In operation, the activating chamber 10 is first brought to a suitable temperature, about 800° C. by combustion of gas therein or by other suitable means and then carbonaceous material admitted through funnel 15 is suspended and dispersed in a current of air introduced through air conduit 18 and is blown through chamber 14 into the vertical chamber 10 where the mixture becomes ignited. I have found that the air volume required for satisfactory working may be varied between 70 and 130 cubic feet (measured at 60° F. and atmospheric pressure) per pound of volatile matter in the carbonaceous material. The best air ratio varies according to the nature of the material being activated, and to the temperature and the rate of carbon-air feed. The air ratio can be readily determined by trial. I have obtained a highly activated carbon from a lignite with an air ratio of about 70 cubic feet per pound of volatile combustible matter in the lignite, as determined by the usual proximate analysis. The tangential relation of chamber 14 to chamber 10 is advantageous and with a suitably regulated air draft the burning off of the volatile matter from the carbonaceous material proceeds rapidly and regularly in chamber 10 and the chamber is held by the heat of the reaction itself at between 800° and 1100° C. In this temperature range many carbonaceous materials have been found to be well activated in the short time during which they are treated in the vertical chamber and the activated material separates from the products of the air combustion in the vertical chamber to settle in the conical bottom 20 and be removed by means of the conduit 21 through the valve 22. The reaction temperature in chamber 10 is controlled by the introduction of steam through pipe 24 and the steam aids in the activation. This pipe advantageously delivers tangentially into chamber 10 and the material separating from the gases in the upper part of chamber 10 is treated with steam in the lower part. The steam is introduced in the quantity necessary to hold the temperature inside chamber 10 at the desired point. $H_2O$ contained in the raw material tempers the heat developed by the air. If desired a cooling chamber may be inserted between chamber 10 and outlet valve 22. Sometimes the flame produced by the ignited mixture in chamber 10 strikes back into projection 14 and ignition may occur as the air and carbon mix. This usually does no harm and in some cases is of advantage in increasing the time of treatment but as a rule it is better to maintain a rate of air flow in 14 sufficient to prevent the flame striking back. Ordinarily the pressure in chamber 10 is kept slightly above atmospheric, a positive pressure around 0.1 inch water being in most cases satisfactory. Higher pressures or subatmospheric pressures can be applied if desired.

Certain materials require a more extended treatment with steam to effect a high degree of activity, and in such cases the apparatus shown in Fig. 3 may be used. In this apparatus an inner un-insulated metal tube 30 is placed in chamber 10 and the steam is admitted near the bottom of tube 30 through valved pipe 31 provided with meter 32. Tube 30 is heated externally by the air activation reaction taking place in chamber 10 and the air treated material is withdrawn from chamber 10 through conduit 33 and valve 34 and is conveyed by conveyor 35 to the hopper 36, from which it is delivered through valve 37 into the top of tube 30. Activation of the material begun in chamber 10 is then completed by the steam treatment in tube 30 and the activated material is withdrawn from the tube through conveyor 38. Gases leave tube 30 through pipe 39 at the top. The tube temperature is observed by means of a pyrometer inserted at 40. In the steam treatment the fine particles of material delivered into tube 30 by valve 37 are retarded in their fall by the upward current of steam and gaseous reaction products and the time of treatment is thereby extended.

In treating various materials to produce activated carbon some variation of method and means is sometimes desirable. For example, when working with a readily activatable material such as some of the spent activated carbons produced in decolorizing processes, it may be desirable to increase the rate of throughput and it may then be advantageous, as stated ante, to use an un-insulated chamber 10 and sometimes even to externally cool this chamber as by a water spray. So doing, a high rate of throughput with a concomitant high rate of heat development and dissipation becomes possible without sacrifice of the degree of activity imparted to the product.

What I claim is:

1. The process of producing activated carbon which comprises forming a dispersed mixture of pulverized carbonaceous material and a limited amount of air, igniting said miture by passing it as a continuous spiralling current into a vertical reaction chamber, relying upon the heat developed in the activating reaction to maintain the reaction chamber at a temperature above 800° C., separating the activated product within the chamber from the reaction gases and separately removing the gases and the product from the chamber.

2. In the activation of carbon, a process which comprises forming a suspension of the material to be activated admixed with a limited quantity of air, igniting the aerial suspension by passing it in a continuous spiralling current into a hot reaction chamber, maintaining a temperature inside the chamber above 800° C. by the combustion of the material with air, simultaneously introducing a controlled quantity of steam into the said reaction chamber at a different point, and separately removing the activated carbon and the gaseous reaction products from said chamber.

3. In the activation of carbon, a process which comprises introducing the material to be activated admixed with a limited quantity of air into a hot reaction chamber, separating the partially activated carbon from the hot reaction gases within the chamber, further activating the separated carbon within the chamber by contacting it with a current of superheated steam, and separating the carbon from the steam.

4. In the production of activated carbon, a process which comprises forming an intimate mixture of powdered carbonaceous material with a limited amount of air, introducing the mixture in a continuous current into a hot reaction chamber, relying upon the heat developed in the reaction to maintain the reaction chamber sufficient to ignite said mixture, withdrawing the activated carbon from the bottom of the chamber and withdrawing the gaseous reaction products at the top.

5. In the production of activated carbon, a process which comprises forming a dispersed mixture of powdered carbonaceous material and a limited amount of air, igniting said mixture by passing it as a continuous spiralling current into a vertical hot reaction chamber, relying upon the heat developed in the activating reaction to maintain the reaction chamber at a temperature above 800° C., and regulating the temperature by separately introducing steam into the reaction chamber.

6. A process of making activated carbon which comprises forming a flowing mixture of powdered carbonaceous material containing volatile combustible matter with air in a ratio between 70 and 130 cubic feet of air per pound of said volatile matter, igniting said mixture by passing it in a continuous spiral current into the side of a vertical activating chamber relying solely upon the heat developed in the oxidation of the material by air to maintain the reaction chamber at an activating temperature and separating the activated product within the chamber from the gases formed in the activating reaction.

7. In producing activated carbon a process which comprises flowing a mixture of pulverized carbonaceous material and air into a reaction chamber maintained at an ignition temperature by the heat developed in the reaction of said mixture, separating the solid material in said chamber from the gaseous reaction products, transferring the separated material to a second chamber located within said reaction chamber and heated by said reaction and treating said material with steam introduced into said second chamber.

In testimony whereof, I have hereunto affixed my signature.

MARSHALL T. SANDERS.